(12) United States Patent
Petersen

(10) Patent No.: US 10,606,082 B2
(45) Date of Patent: Mar. 31, 2020

(54) PROJECTION DEVICE FOR SMART GLASSES, METHOD FOR DISPLAYING IMAGE INFORMATION WITH THE AID OF A PROJECTION DEVICE, AND CONTROL UNIT

(71) Applicant: Robert Bosch GmbH, Stuttgart (DE)

(72) Inventor: Andreas Petersen, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/074,035

(22) PCT Filed: Jan. 30, 2017

(86) PCT No.: PCT/EP2017/051875
§ 371 (c)(1),
(2) Date: Jul. 30, 2018

(87) PCT Pub. No.: WO2017/133992
PCT Pub. Date: Aug. 10, 2017

(65) Prior Publication Data
US 2019/0041648 A1   Feb. 7, 2019

(30) Foreign Application Priority Data
Feb. 2, 2016 (DE) .......................... 10 2016 201 567

(51) Int. Cl.
*G02B 27/01* (2006.01)
*G09G 3/00* (2006.01)
*F21V 8/00* (2006.01)

(52) U.S. Cl.
CPC ......... *G02B 27/0172* (2013.01); *G02B 6/005* (2013.01); *G02B 6/0023* (2013.01);
(Continued)

(58) Field of Classification Search
CPC .............. G09G 3/001; G09G 2354/00; G02B 27/0172; G02B 6/0023; G02B 6/005;
(Continued)

(56) References Cited

U.S. PATENT DOCUMENTS

| 6,252,989 | B1 | 6/2001 | Geisler et al. |
| 6,351,335 | B1* | 2/2002 | Perlin ................... G02B 13/00 345/1.1 |
| 2010/0149073 | A1* | 6/2010 | Chaum ............. G02B 27/0093 345/8 |

OTHER PUBLICATIONS

International Search Report for PCT/EP2017/051875, dated Apr. 20, 2017.
(Continued)

*Primary Examiner* — Robert J Michaud
(74) *Attorney, Agent, or Firm* — Norton Rose Fulbright US LLP; Gerard Messina

(57) ABSTRACT

A projection device for smart glasses. The projection device includes an image-generation unit for generating at least one first ray of light representing first image information, and a second ray of light representing second image information. The first ray of light and the second ray of light differ from each other with regard to a beam divergence. In addition, the first image information and the second image information differ from each other with regard to a perceivable image sharpness. Moreover, the projection device includes at least one deflection element, which is configured to display the first image information within a first field of view of an eye using the first ray of light, and to display the second image information within a second field of view of the eye disposed outside the first field of view, using the second ray of light.

18 Claims, 6 Drawing Sheets

(52) U.S. Cl.
CPC ......... *G02B 27/0179* (2013.01); *G09G 3/001* (2013.01); *G02B 2027/014* (2013.01); *G02B 2027/0112* (2013.01); *G02B 2027/0123* (2013.01); *G02B 2027/0174* (2013.01); *G02B 2027/0178* (2013.01); *G02B 2027/0187* (2013.01); *G09G 2354/00* (2013.01)

(58) Field of Classification Search
CPC ............ G02B 27/0179; G02B 27/0112; G02B 27/0113; G02B 27/0123; G02B 27/014; G02B 27/0174; G02B 27/0178; G02B 27/0187
See application file for complete search history.

(56) References Cited

OTHER PUBLICATIONS

Yoshida, et al., "Design and Applications of a High-Resolution Insert Head-Mounted-Display", Proceedings of The Virtual Reality Annual International Symposium. Research Triangle Park, Mar. 11-15, 1995; [Proceedings of The Virtual Reality Annual International Symposium], Los Alamitos, IEEE Comp. Soc. Press, US, Mar. 11, 1995 (Mar. 11, 1995), pp. 84-93, XP000529974.

* cited by examiner

PROJECTION DEVICE FOR SMART GLASSES, METHOD FOR DISPLAYING IMAGE INFORMATION WITH THE AID OF A PROJECTION DEVICE, AND CONTROL UNIT

FIELD OF THE INVENTION

The present invention is based on a device or a method according to the definition of the species in the independent claims. A computer program is also a subject matter of the present invention.

BACKGROUND INFORMATION

Smart glasses for superimposing information in a field of view of a user are believed to be understood.

SUMMARY OF THE INVENTION

Against this background, the approach presented here introduces a projection device for smart glasses, a method for displaying image information with the aid of a projection device, and furthermore, a control unit that uses this method and finally a corresponding computer program according to the main claims. The measures indicated in the dependent claims allow for advantageous further developments and improvements of the device indicated in the independent claim.

A projection device for smart glasses is introduced, the projection device having the following features:

An image-generation unit for generating at least one first ray of light representing first image information, and a second ray of light representing second image information, the first ray of light and the second ray of light differing from each other with regard to a beam divergence, and the first image information and the second image information differing from each other with regard to a perceivable image sharpness; and
at least one deflection element, which is configured to display the first image information within a first field of view of an eye using the first ray of light, and to display the second image information within a second field of view of the eye using the second ray of light, the second field of view being disposed outside the first field of view.

Smart glasses may be understood as glasses for the display of visual information in a field of view of a wearer of the smart glasses. An item of visual information, for example, may be understood as an image point or as image content. Depending on the embodiment, the first or the second image information may represent a monochromatic or color image. The two items of image information, for example, may represent one and the same image content at different virtual image distances, and thus at differently perceived image sharpnesses. That is to say, the first image information may involve an image that is perceived as being in focus, and the second image information may be an image that is perceived as being out of focus. The two rays of light may be a laser beam (monochromatic image display) or a plurality of approximately superimposed laser beams (multi-color display) in each case. The image sharpness is no physical property of the ray of light but a consequence of the distance between the eye of the observer and the distance of the virtual image. For example, the first ray of light displays a virtual image at a great distance while the second ray of light may represent an image on the plane of an eyeglass lens. Because of the short distance from the eye, this second image is unable to be displayed sharply.

A deflection element may be understood as an element for deflecting the first and the second rays of light. More specifically, the deflection element may be a hologram or a mirror. Conceivable, for instance, are also other methods of action. For example, the deflection element may also be realized as an optical phase array, an electro-optical or a magneto-optical deflector or as an array of such deflectors. The deflection element, for example, is able to be integrated into an eyeglass lens of the smart glasses. Depending on the specific embodiment, the deflection element may have at least a first deflection section for deflecting the first ray of light into the first field of view, and a second deflection section for deflecting the second ray of light into the second field of view. The deflection sections may be hologram or mirror layers, for instance. A field of view may be understood as a range that is perceivable by an eye of the wearer who is wearing the smart glasses. The first and the second fields of view may adjoin each other or may at least partially overlap each other, for example. In particular, the first field of view may be a central field of view of the eye, and the second field of view may be a peripheral field of view of the eye.

Each ray of light may cover the entire field of view. Only the image information of the second ray of light that is perceived as being out of focus may be able to be selectively deactivated as a function of the gaze direction of the user.

The first ray of light, for example, may also be a beam of rays which is made up of a plurality of first rays of light. In the same way, the second ray of light may be a beam of rays which is made up of a plurality of second rays of light.

The approach introduced here is based on the recognition that smart glasses are able to project images having different degrees of sharpness into different fields of view of an eye of an observer with the aid of a suitable deflection element, in particular a holographic optical element, for instance. Utilizing the physiology of the human eye, for example, it is possible to display sharp image content only where it is also able to be perceived.

This allows for a resource-sparing system design featuring the lowest possible number of components. For example, the number of required light sources in a monochrome image display is able to be reduced to two light sources, and in a full color image display (RGB), it is able to be reduced to six light sources. At two primary colors and the secondary colors resulting therefrom, even four light sources, for example, may be sufficient. As a result, the number of required reflection layers such as hologram layers may also be reduced in a corresponding manner. At the same time, the approach presented here allows for the realization of smart glasses that have a large field of view and a large effective eye box. The functionality of the smart glasses is therefore able to be improved.

According to one embodiment, the image-generation unit may be configured to generate the first ray of light and the second ray of light in such a way that the first image information has a greater perceived image sharpness than the second image information. The deflection element may be configured to display the first image information within a central field of view of the eye as the first field of view and, additionally or alternatively, display the second image information within a peripheral field of view of the eye as the second field of view. The first image information may have an image featuring a greater image sharpness. The different degrees of image sharpness may particularly be created by the virtual image distance. For example, using a correspondingly powerful contact lens for extreme farsightedness, the second image information may also be sharply perceivable. A central field of view may be understood as a range in which the eye perceives images with high visual acuity, i.e. foveally. A peripheral field of view may be understood as a range in which the eye perceives images with reduced visual acuity, i.e. peripherally. For example, the central field of view may at least partially be surrounded by the peripheral field of view. This makes it possible to display image information of high image sharpness only in the ranges that the eye is able to perceive, i.e. in which the eye is actually also able to see clearly. This may improve the efficiency of the projection device, and the production costs of the projection device are therefore able to be reduced.

It is advantageous if the deflection element is configured to display the first image information within a first angular range of the first field of view allocated to a first position of the eye and, additionally or alternatively, within a further angular range of the first field of view allocated to a further position of the eye. An angular range, for example, may be understood as an eye box having a specific opening angle within which the eye is able to perceive the first image information at a certain eye position. Depending on the specific embodiment, the opening angle may be between 5 and 20 degrees, for instance. With the aid of this embodiment, the first image information is able to be displayed in different angular ranges in the first field of view.

According to a further embodiment, the deflection element may be configured to display the first image information within an angular range, as the first angular range, that is disposed adjacent to the second angular range, or that at least partially overlaps with the second angular range. This makes it possible to ensure a display of the first image information without any gaps in the first field of view.

In addition, the deflection element may be configured to display the first image information within at least one further angular range of the first field of view allocated to a further position of the eye. This allows the first image information to be displayed in a plurality of different angular ranges. For example, the angular ranges may be disposed in the form of a raster for this purpose.

It is also advantageous if the deflection element includes at least one hologram layer for deflecting the first ray of light and, additionally or alternatively, for deflecting the second ray of light. A hologram layer may be understood as a holographic optical element that is realized in the form of a layer. This development allows for a simple and cost-effective realization of the deflection element.

In addition, the projection device may include at least one further deflection element, which is able to be configured to display the first image information within the first field of view using the first ray of light. In particular, the deflection element may be configured to generate at least one first eye box for perceiving the first image information within the first field of view. Accordingly, the further deflection element may be configured to generate at least one second eye box for perceiving the first image information within the first field of view. The first eye box and the second eye box may in particular be disposed next to each other. This makes it possible to generate eye boxes that feature larger angular ranges.

According to a further specific embodiment, the projection device may have an eyeglass lens. The deflection element is able to be realized as part of the eyeglass lens. An eyeglass lens, for example, may be a disk or a lens made of glass or plastic. Depending on the specific embodiment, the eyeglass lens may be shaped in order to correct refraction errors of the eye. This specific embodiment allows for a particularly simple, unobtrusive and cost-effective integration of the deflection element.

The deflection element may extend across at least a main part of a surface of the eyeglass lens. This allows for the largest possible coverage of a field of view of the eye by the deflection element.

According to a further embodiment, the projection device may have an eye-position ascertainment unit for ascertaining an eye position of the eye. The image-generation unit may be configured to generate the first ray of light and, additionally or alternatively, the second ray of light as a function of the eye position. The eye-position ascertainment unit, for example, may include a camera for detecting the eye position. This embodiment makes it possible to achieve a display of the first or the second image information that is dependent on the eye position and thus saves energy.

In addition, the image-generation unit may be configured to generate the first ray of light and, additionally or alternatively, the second ray of light in such a way that the first image information and, additionally or alternatively, the second image information represents an at least two-color image. This makes it possible to improve the display quality of the projection device.

The approach presented here furthermore provides a method for displaying image information with the aid of a projection device according to one of the preceding embodiments, the method including the following steps:

Generating the first ray of light and the second ray of light; and

Deflecting the first ray of light in order to display the first image information within the first field of view, and deflecting the second ray of light in order to display the second image information within the second field of view.

For example, this method is able to be implemented in software or hardware or in a mixed form of software and hardware, e.g., in a control unit.

In addition, the approach introduced here provides a control unit, which is configured to execute, actuate and/or implement in corresponding devices the steps of a variant of a method introduced here. This embodiment variant of the present invention in the form of a control unit is also able to achieve the objective on which the present invention is based in a rapid and efficient manner.

For this purpose, the control unit may include at least one processing unit for the processing of signals or data, at least one memory unit for storing signals or data, at least one interface with a sensor or with an actuator for reading in sensor signals from the sensor or for outputting control signals to the actuator, and/or at least one communications interface for reading in or outputting data, which are embedded in a communications protocol. The processing unit, for instance, may be a signal processor, a microcontroller or the like, and the memory unit may be a flash memory, an EPROM or a magnetic memory unit. The communications interface may be configured to read in or output data in a wireless and/or a line-bound manner, and a communications interface that is able to read in or output the line-bound data may read in these data, e.g., electrically or optically, from a corresponding data-transmission line or output these data onto a corresponding data-transmission line.

In this context, a control unit may be understood as an electrical device, which processes sensor signals and outputs control and/or data signals as a function thereof. The device may have an interface, which is able to be configured in the form of hardware and/or software. In the case of a hardware design, the interfaces may be part of what is known as a system ASIC, for example, which includes a wide variety of functions of the control unit. However, it is also possible that the interfaces are discrete integrated switching circuits or are at least partially made up of discrete components. In the case of a software development, the interfaces may be software modules, which are provided on a microcontroller in addition to other software modules, for example.

Also advantageous is a computer-program product or a computer program having program code, which is able to be stored on a machine-readable carrier or memory medium such as a semiconductor memory, a hard disk memory, or an optical memory, and which is used for executing, implementing and/or actuating the steps of the present method according to one of the afore-described embodiments, in particular when the program product or the program is executed on a computer or on a device.

Exemplary embodiments of the present invention are shown in the drawing and elucidated in greater detail in the following description.

In the following description of advantageous exemplary embodiments of the present invention, identical or similar reference numerals are used for the elements that are shown in the various figures and have a similar effect, while a repeated description of these elements is omitted.

DETAILED DESCRIPTION

Figure 1:
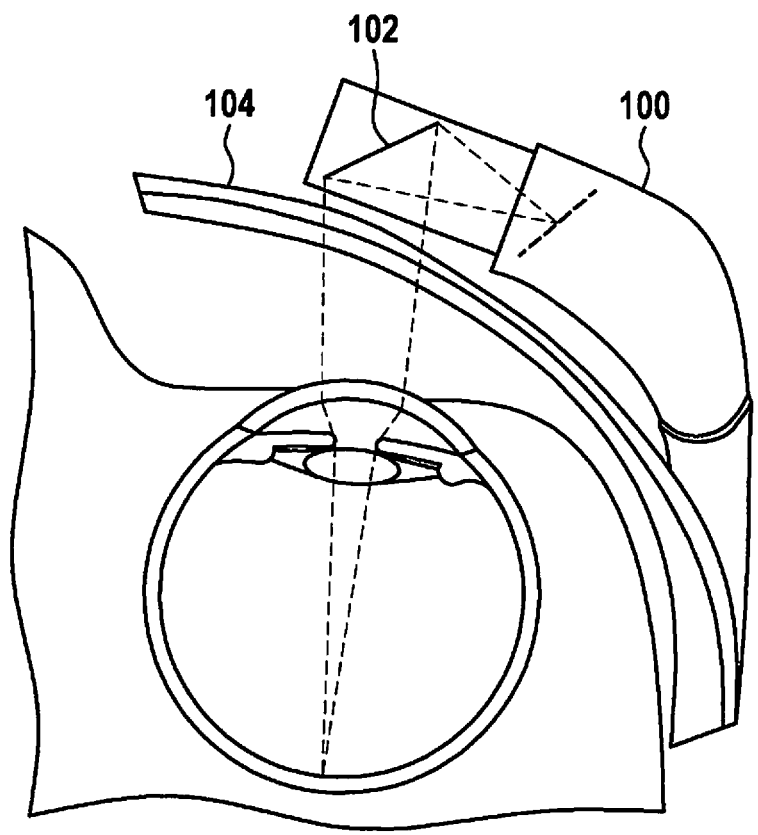
FIG. 1 shows a schematic illustration of a method of functioning of a near-to-eye display of smart glasses.

FIG. 1 shows a schematic representation of a method of functioning of a near-to-eye display 100 of smart glasses, or in short, an NTE display. Shown is a micro-display as a near-to-eye display 100, which may be viewed via a deflection optics in the form of a prism 102 and a lens 104. The field of view, abbreviated: FOV, of such a system may be limited by the size of the incoupling prism 102.

Smart glasses superimpose image information for the user onto the user's field of view. In general, a distinction can be made between smart glasses for virtual reality and smart glasses for augmented reality, abbreviated as AR. In the case of smart glasses for virtual reality, a real environment is able to be masked and replaced with a virtual world. In the case of smart glasses for an augmented reality, virtual image contents are able to be superimposed onto the real environment. AR smart glasses may thus be configured in transparent or partially transparent form, for example. Possible application areas of AR smart glasses, for example, are sports glasses for displaying the speed, navigation data, the step frequency or pulse beat; safety glasses for workshops; glasses or helmets in the context of driver-assistance or navigation systems; safety glasses for the display of instructions, operating instructions or cable wiring; as well as glasses for home applications, e.g., for the display of a virtual control button or a cooking recipe.

AR smart glasses may be realized as an NTE display or as a retinal-scan display, in short: RSD. In the case of NTE displays, a real image is generated in very close proximity to the eye of the observer, e.g., with the aid of a micro-display, and viewed via an optics system, e.g., a magnifying glass. FIG. 1 shows one example of such a system. The virtual image appears to the eye at a certain distance and will come into focus only when the eye focuses to this distance.

Figure 2:
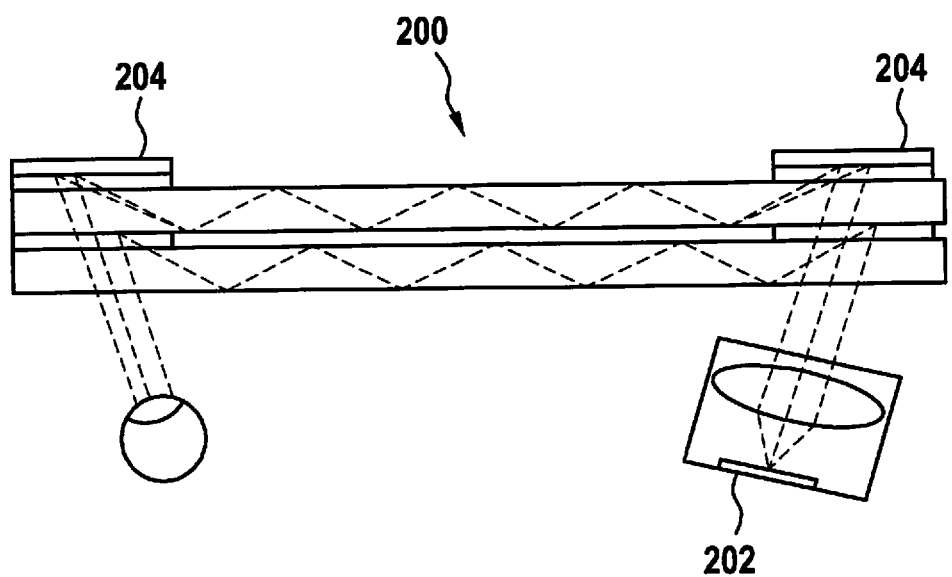
FIG. 2 shows a schematic illustration of a method of functioning of a near-to-eye display of smart glasses.

FIG. 2 shows a schematic illustration of a method of functioning of a near-to-eye display 200 of smart glasses. In this case, a micro-display 202 is viewed via a deflection optics system and a lens. In contrast to the system illustrated in FIG. 1, the coupling of the image into the eye is not realized with the aid of an additional optical element in front of the eyeglass lens in this instance but using a light conductor within the eyeglass lens. In addition, incoupling and decoupling elements 204, in this case, holograms, are integrated. The space required by incoupling and decoupling elements 204 depends on the desired field of view.

In the case of retinal-scan displays, the image is written directly onto the retina. At no point in time does the image therefore exist outside the eye.

To be perceivable by the eye, the exit pupil of the system must spatially overlap with the entry pupil of the eye.

Figure 3:
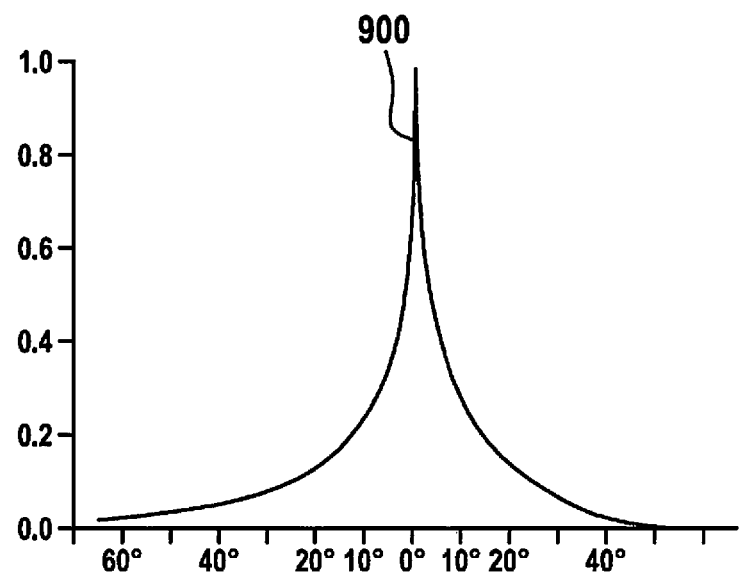
FIG. 3 shows a diagram to illustrate a visual acuity as a function of an angle at an optical axis.

FIG. 3 shows a diagram to illustrate a visual acuity 900, plotted on the y-axis in this instance, as a function of an angle plotted on an optical axis, i.e. on the x-axis in this case. The highest density of sensory cells is located in the region of what is referred to as the macula of the eye, and the highest visual acuity is achieved in its center, which is known as the fovea centralis or fovea. As can be gathered from FIG. 3, the range of sharp sight is very limited. The visual acuity drops to 30 percent of its maximum value within a mere plus/minus 5 degrees. In order to let the range of sharp sight appear larger, the human eye subconsciously moves a few times per second in order to image a respective other region of the environment on the fovea.

Figure 4:
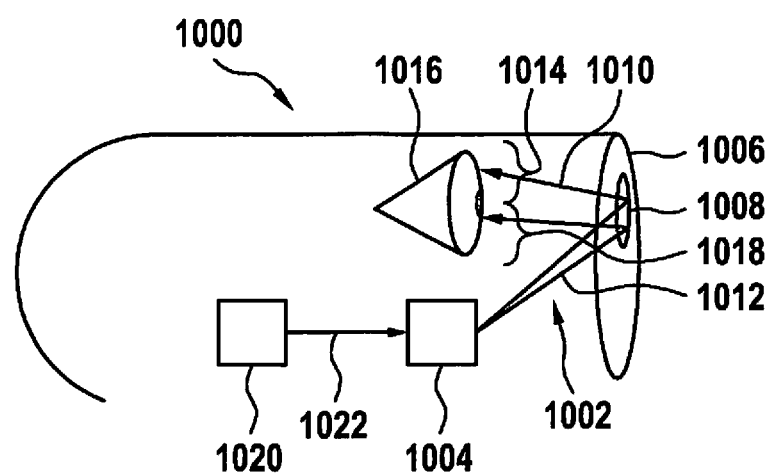
FIG. 4 shows a schematic illustration of smart glasses together with a projection device according to an exemplary embodiment.

FIG. 4 shows a schematic illustration of smart glasses 1000 having a projection device according to an exemplary embodiment. Smart glasses 1000 include a projection device 1002 having an image-generation unit 1004, and a deflection element 1008, which is integrated into an eyeglass lens 1006 of smart glasses 1000 by way of example. Image-generation unit 1004 is configured to generate a first ray of light 1010 representing first image information, or a corresponding beam of rays, as well as a second ray of light 1012 representing second information, or a corresponding beam of rays and to steer them to deflection element 1008. The two items of image information differ with regard to the perceivable image sharpness, and the two items of image information may represent one and the same image content. Deflection element 1008, e.g., a hologram layer or a composite of a plurality of hologram layers, is configured to deflect first ray of light 1010 into a first field of view 1014 of an eye 1016 of a wearer of smart glasses 1000 and to deflect second ray of light 1012 into a second field of view 1018 of eye 1016. The two fields of view 1014, 1018 are generally completely congruent, i.e. both fields of view cover the entire field of view or eyeglass lens. According to one exemplary embodiment, deflection element 1008 extends across a large part of a surface of eyeglass lens 1006 in order to cover the largest possible area of a field of view of eye 1016. For example, first field of view 1014 is a central field of view within which eye 1016 is able to perceive images with high visual acuity, and second field of view 1018 is a peripheral field of view within which eye 1016 is able to perceive images only with low visual acuity.

According to one exemplary embodiment, image-generation unit 1004 generates first ray of light 1010 in such a way that the first image information has a greater perceivable image sharpness than the second image information represented by second ray of light 1012, so that the image information featuring the greater image sharpness is displayed only in the particular one of the two fields of view 1014, 1018 in which eye 1016 is actually able to see clearly.

According to the exemplary embodiment shown in FIG. 4, smart glasses 1000 also include an optical control unit 1020 for the actuation of image-generation unit 1004. For this purpose, control unit 1020 transmits a corresponding control signal 1022 to image-generation unit 1004, image-generation unit 1004 being configured to generate first ray of light 1010 and second ray of light 1012 using control signal 1022.

Depending on the exemplary embodiment, image-generation unit 1004 or control unit 1020 may be fastened to a frame of smart glasses 1000.

Figure 5:
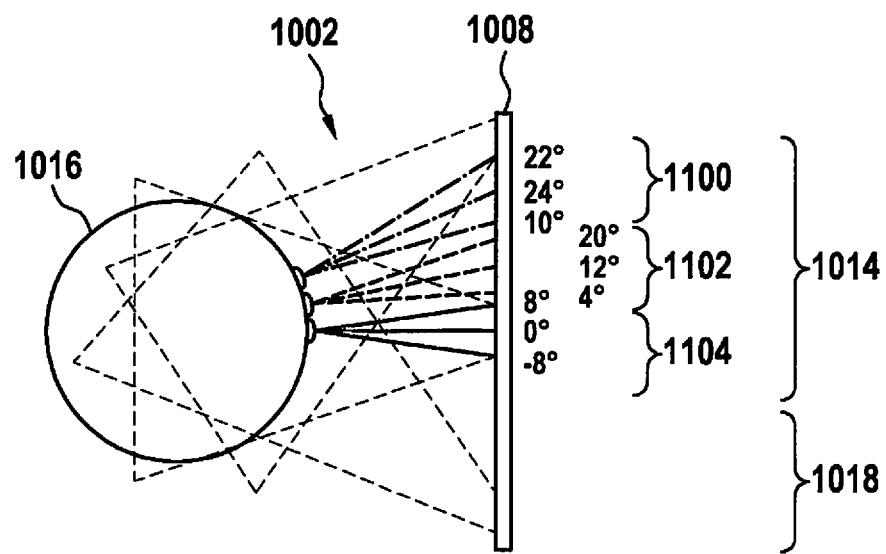
FIG. 5 shows a schematic illustration of a projection device according to an exemplary embodiment.

FIG. 5 shows a schematic illustration of a projection device 1002 according to an exemplary embodiment, e.g., a projection device as described in the previous text with the aid of FIG. 4. In this case, eye 1016 is offered sharp image information in first field of view 1014, which is a central field of view in this case. Since this central field of view comes to lie in different locations on deflection element 1008, which in this case is a holographic optical element, for different eye positions of eye 1016, it is exemplarily subdivided into a first angular range 1100, a second angular range 1102, and a further angular range 1104, each one of the three angular ranges being allocated a particular eye position of eye 1016. According to this exemplary embodiment, the three angular ranges are configured to sharply display a field of view of 16 degrees in each case. Projection device 1002, for instance, is configured to display the remaining second field of view 1018 via a further eye box having its own light source and own deflection element, e.g., a further holographic optical element. The further eye box has a certain minimum size so that the pupil of eye 1016 lies within the eye box in every eye position.

The illustration of angular ranges 1100, 1102, 1104 in the lower region of eyeglass lens 1018 has been omitted for reasons of clarity.

The entire field of view is subdivided into individual subranges 1100, 1102, 1104. In these subranges, the first image information is offered via a collimated, i.e., a non-divergent or barely convergent, ray of light such as a laser beam. As described earlier, due to the small ray diameter, a relatively small eye box with theoretically clearly perceivable image information comes about. A slight movement of the eye has the result that the pupil is no longer hit. However, since the eye is capable of truly sharp imaging only in a small range, the one small eye box having a large angular range is subdivided into a plurality of small eye boxes having a small angular range in each case, similar to subranges 1100, 1102, 1104, as will be explained in greater detail in the following text with the aid of FIG. 6. These multiple eye boxes are then placed in such a way that they hit the pupil at the respective associated eye positions. It is also possible that multiple eye boxes simultaneously overlap with the pupil. The first image information in the individual eye boxes should therefore be displayed in a manner that is shifted with respect to the other in such a way that no double images are produced. In this context it is important that all eye boxes with the first image information are activated in a permanent and simultaneous manner.

The second image information is also offered in the entire field of view, but a divergent ray of light is used in this case. The hologram generates the divergence from the originally collimated laser beam. The divergent ray of light has two effects: First of all, a large eye box is generated (see FIG. 5), and secondly, the image information is not sharply imaged by the human eye without a correction lens. However, if only the peripheral field of view, which can image only without sharpness anyway, is then supplied with the second image information, the advantage of the large eye box is maintained. In this context it is important that the second image information is always deactivated in the central field of view so that it is not superimposed onto the sharp image information. Since the central field of view shifts with the eye movement, the eye movement should be tracked with the aid of eye tracking, and the second image information should be controlled accordingly.

Depending on the exemplary embodiment, at least two of the three angular ranges 1100, 1102, 1104 are disposed next to each other and placed in such a way that they at least partially overlap.

Using projection device 1002, the field of view is divided into two fields, i.e. the first, which in this case is central field of view 1014 featuring high acuity, and the second, in this case peripheral field of view 1018 featuring low acuity. In this way the image display is adapted to the physiology of the human eye.

Figure 6:
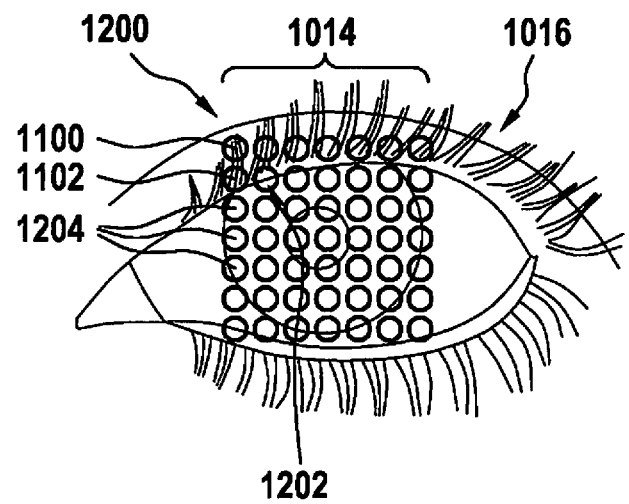
FIG. 6 shows a schematic illustration of a system of eye boxes for the display of image information with the aid of a deflection element according to an exemplary embodiment.

The position of first field of view 1014 on the eyeglass lens or on the deflection element 1008 disposed thereon depends on the eye position. Since the pupil of eye 1016 is located at different locations in different eye positions, multiple eye boxes are generated that correspond to these eye positions. Three eye boxes for three different eye or pupil positions are shown in FIG. 5 by way of example. Each eye box covers an exemplary angular range of 16 degrees. To ensure that eye 1016 receives corresponding image information for each eye position, the eye boxes are spatially disposed, for instance. One possible placement of the eye boxes is shown in FIG. 6. In order to achieve a clean transition between the individual eye boxes that the eye is unable to notice, projection device 1002 may be configured to generate the eye boxes, in particular eye boxes that adjoin one another, in such a way that the angular ranges overlap. Despite the overlap of the angular ranges of the eye boxes, within geometrical limits it is still possible to write the eye boxes onto one and the same hologram layer as the deflection element in a spatially separated manner, as described in the following text with the aid of FIGS. 13 and 14. As a matter of principle, it is therefore possible to display all eye boxes illustrated in FIG. 6 using a single hologram layer and a single light source.

Projection device 1002, for example, may be combined with a correction-optics system, such as it is used in glasses, for instance. The combinability with correction optics systems results from the ability to apply the holographic optical systems on curved surfaces, e.g., ground eyeglass lenses.

For a true and distortion-free image display, the image-generation unit is configured to generate the first or the second ray of light in such a way that an item of image information to be displayed will be perceived as a geometrically correct image in every eye position. This is advantageous in particular when the pupil of eye 1016 simultaneously views a plurality of eye boxes, as is usually the case. Depending on the exemplary embodiment, a corresponding conversion of the image data takes place, either in the image-generation unit itself, e.g., using a microcontroller or FPGA, or externally, for instance in a mobile user terminal such as a cell phone.

Optionally, projection device 1002 includes more than one light source or more than one deflection element for generating the eye boxes in first field of view 1014. More specifically, projection device 1002 is configured to write adjacent eye boxes onto different hologram layers as deflection elements. In doing so, for example, only every second eye box is written onto a first hologram layer, while the remaining eye boxes are written onto a second hologram layer. This makes it possible to generate eye boxes that feature larger angular ranges. Additionally or alternatively, it is then possible to ensure a larger spatial safety distance between the areas of the individual eye boxes on the hologram layers.

According to an exemplary embodiment, projection device 1002 is used for the display of monochromatic image information. However, by using light sources of different colors, e.g., in the RGB range, it is also possible to display color images with the aid of projection device 1002. The number of required light sources and required deflection elements would triple accordingly in such a case. However, in an effort to keep the installation space of such an RGB system small nevertheless, a combination of a plurality of light sources at the chip level is conceivable, such as via on-chip waveguides, for example.

The tracking of the eye positions that is required for this purpose is carried out directly via an already installed laser scanner as the eye-position ascertainment unit, for instance. At least one of the already installed light sources in the visible wavelength range or also a further light source in the invisible wavelength range, e.g., in the infrared range, is used for this purpose. A back reading is carried out via an optical transmission path, for example, i.e. possibly via a micromirror, or via a suitable detector installed at another location in the system. Alternatively, the eye-position ascertainment unit includes a camera for detecting the eye positions.

The ascertainment of the gaze direction, i.e. the eye position, may also be carried out by measuring the eye background. For example, in this context it may be exploited that a laser beam scans the eye background for the image generation. If an optical return channel is provided, then an image of the eye background and the blood vessels that extend therein is able to be generated. From the displacements of this image, as they occur during eye movements, the eye movement may be inferred in a similar manner as in the case of an optical computer mouse, for example.

Using projection device 1002, for example, a laser beam is able to be written directly onto the retina of eye 1016. Thus, it is possible to generate an image or video of the retina with the aid of projection device 1002. This is realized, for example, by a corresponding back reading via the optical transmission path. With the aid of such a system, the wearer of the smart glasses, for example, is able to be geometrically identified on the basis of a vein structure of the retina. Also conceivable would be the determination of a pulse beat as a function of the pulsation of the veins that extend in the retina, or the determination of an oxygen saturation via a color of the blood flowing in the veins.

FIG. 6 shows a schematic representation of a system of eye boxes 1200, 1204 for the display of image information with the aid of a deflection element according to an exemplary embodiment. Shown is an exemplary system of the eye boxes for a sharp display of first field of view 1014, which is the central field of view of eye 1016 in this case. According to this exemplary embodiment, in addition to eye box 1200 for first angular range 1100 and eye box 1202 for second angular range 1102, first field of view 1014 encompasses a plurality of further eye boxes 1204, which are disposed in a grid, which is a square grid in this instance, around the pupil of eye 1016.

Figure 8:
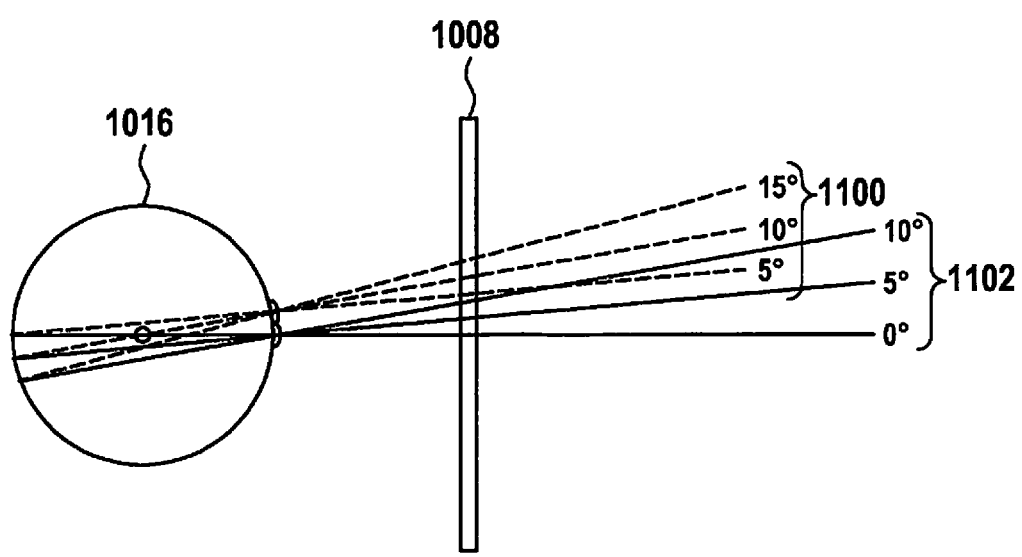
FIG. 8 shows a schematic illustration of two overlapping angular ranges for the display of image information with the aid of a deflection element according to an exemplary embodiment.

Each one of these eye boxes covers a separate angular range of first field of view 1014. The angular ranges, especially those of adjacent eye boxes, may overlap in this case. FIG. 8 illustrates such an overlap in a side view.

Figure 7:
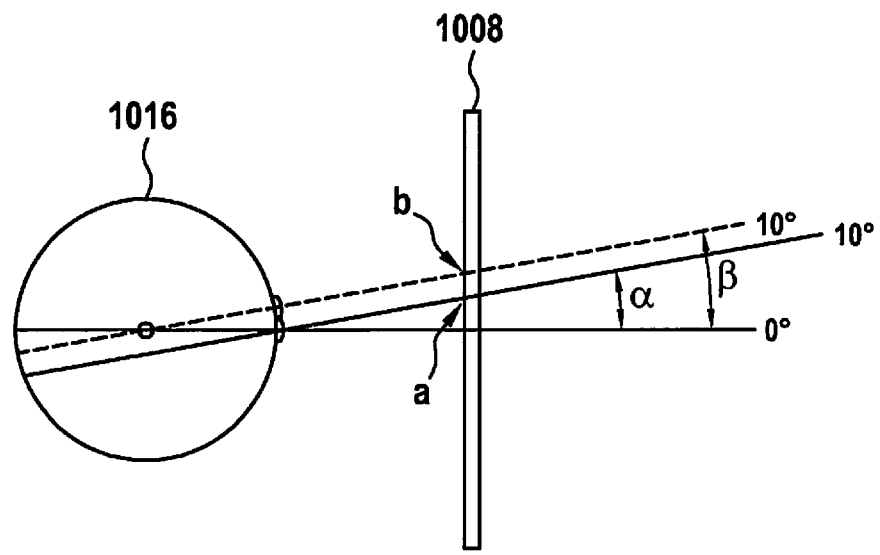
FIG. 7 shows a schematic illustration of a correlation between an orientation of an eye and an image position on a deflection element according to an exemplary embodiment.

FIG. 7 shows a schematic representation of a correlation between an orientation of an eye 1016 and an image position on a deflection element 1008 according to an exemplary embodiment. For example, deflection element 1008 is part of a projection device as it was described in the preceding text with the aid of FIGS. 4 through 6. Shown is the eyeglass lens together with a holographic optical element as deflection element 1008. According to this exemplary embodiment, deflection element 1008 is configured to fade in an image point in the field of view at 10 degrees.

If eye 1016 is focused on $\beta=0°$, for example, then the image point is generated at $\alpha=10°$, i.e. the image point is imaged at the location a on deflection element 1008.

However, if eye 1016 is focused on $\beta=10°$, then the image point is generated at $\alpha=0°$, i.e. the image point is imaged at location b on deflection element 1008. As a result, the same image information is generated at two different locations on deflection element 1008.

FIG. 8 shows a schematic illustration of two overlapping angular ranges for the display of image information with the aid of a deflection element 1008 according to an exemplary embodiment. Shown are two eye boxes, spatially separated from each other on deflection element 1008, with the associated eye positions of eye 1016. According to this particular exemplary embodiment, the overlap is created when the eye is focused on $\beta=0°$ or on $\beta=10°$. Although the eye boxes are spatially separated from each other on deflection element 1008, the two angular ranges 1100, 1102 overlap.

Figure 9:
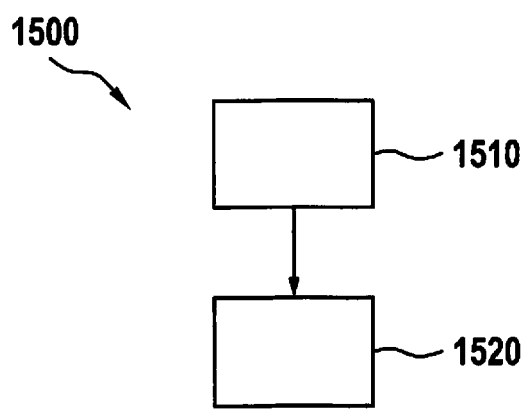
FIG. 9 shows a flow diagram of a method according to an exemplary embodiment.

FIG. 9 shows a flow diagram of a method 1500 according to an exemplary embodiment. For example, method 1500 may be carried out using a projection device as previously described on the basis of FIGS. 4 through 8. In doing so, in a step 1510, the first and the second ray of light or corresponding beams of light are generated by the image-generation unit. In a further step 1520, the first ray of light or the first beam of light is deflected with the aid of the deflection element in such a way that the first image information is displayed within the first field of view. In a corresponding manner, the second ray of light is deflected in order to display the second image information within a second field of view.

Figure 10:
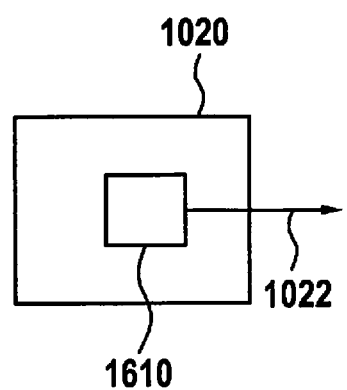
FIG. 10 shows a schematic illustration of a control unit according to an exemplary embodiment.

FIG. 10 shows a schematic representation of a control unit 1020 according to an exemplary embodiment, such as a control unit as described previously on the basis of FIG. 4.

Control unit 1020 includes a generation unit 1610, which is configured to generate control signal 1022 for the control of the image-generation unit.

Depending on the exemplary embodiment, control unit 1020 is configured as an external unit or as a unit that is integrated into the image-generation unit.

If an exemplary embodiment includes an "and/or" linkage between a first feature and a second feature, then this should be read as indicating that the exemplary embodiment according to one specific embodiment includes both the first and the second feature, and according to a further specific embodiment, it includes either only the first feature or only the second feature.

What is claimed is:

1. A projection device for smart glasses, comprising:
    an image-generation unit to generate at least one first ray of light representing first image information, and a second ray of light representing second image information, the first ray of light and the second ray of light differing from each other with regard to a beam divergence, and the first image information and the second image information differing from each other with regard to a perceivable image sharpness; and
    at least one deflection element to display the first image information within a first field of view of an eye using the first ray of light, and to display the second image information within a second field of view of the eye using the second ray of light, the second field of view being located outside the first field of view;
    wherein the image-generation unit is configured to generate the first ray of light and the second ray of light so that the first image information has a greater perceived image sharpness than the second image information, the deflection element being configured to at least one of: (i) display the first image information within a central field of view of the eye as the first field of view, and/or (ii) display the second image information within a peripheral field of view of the eye as the second field of view; and
    wherein the first image information and the second information represent exactly the same image content as one another but at the differing perceived image sharpness relative to one another.

2. The projection device of claim 1, wherein the deflection element is configured to display the first image information within a first angular range, allocated to a first position of the eye, of the first field of view and/or within a further angular range, allocated to a further position of the eye, of the first field of view.

3. The projection device of claim 2, wherein the deflection element is configured to display the first image information within an angular range as the first angular range, which is disposed adjacent to the second angular range or which at least partially overlaps with the second angular range.

4. The projection device of claim 1, wherein the deflection element is configured to display the first image information within at least one further angular range, allocated to a further position of the eye, of the first field of view.

5. The projection device of claim 1, wherein the deflection element has at least one hologram layer for deflecting at least one of the first ray of light and the second ray of light.

6. The projection device of claim 1, further comprising:
    at least one further deflection element and a further light source, the further deflection element being configured to display the first image information within the first field of view, using the ray of light of the further light source, the deflection element being configured to generate at least one first eye box for perceiving the first image information within the first field of view, and the further deflection element being developed to generate at least one second eye box for perceiving the first image information within the first field of view, the first eye box and the second eye box being disposed adjacent to each other.

7. The projection device of claim 1, further comprising:
    an eyeglass lens, the deflection element being realized as part of the eyeglass lens and/or being applied on the eyeglass lens.

8. The projection device of claim 7, wherein the deflection element extends across at least a main part of a surface of the eyeglass lens.

9. The projection device of claim 1, further comprising:
    an eye-position ascertainment unit to ascertain an eye position of the eye, the image-generation unit being configured to generate the first ray of light and/or the second ray of light as a function of the eye position, and/or the eye-position ascertainment unit being configured to ascertain the eye position using a laser.

10. The projection device of claim 1, wherein the image-generation unit is configured to generate the first ray of light and/or the second ray of light so that the first image information and/or the second image information represents at least a two-color image.

11. The projection device of claim 1, wherein the image-generation unit is configured to generate the first ray of light and/or the second ray of light so that the first image information and/or the second image information represents a multi-color image.

12. The projection device of claim 1, wherein each of the first ray of light and the second ray of light covers an entire field of view.

13. A method for displaying image information with a projection device, the method comprising:
    generating at least one first ray of light and a second ray of light, wherein the projection device projection device includes an image-generation unit to generate the at least one first ray of light representing first image information, and the second ray of light representing second image information, the first ray of light and the second ray of light differing from each other with regard to a beam divergence, and the first image information and the second image information differing from each other with regard to a perceivable image sharpness, and at least one deflection element to display the first image information within a first field of view of an eye using the first ray of light, and to display the second image information within a second field of view of the eye using the second ray of light, the second field of view being located outside the first field of view; and
    deflecting the first ray of light to display the first image information within the first field of view, and deflecting the second ray of light to display the second image information within the second field of view;
    wherein the image-generation unit generates the first ray of light and the second ray of light so that the first image information has a greater perceived image sharpness than the second image information, wherein the deflecting includes: (i) displaying the first image information within a central field of view of the eye as the first field of view, and/or (ii) displaying the second image information within a peripheral field of view of the eye as the second field of view; and wherein the first image information and the second information represent exactly the same image content as one another but at the differing perceived image sharpness relative to one another.

14. The method as recited in claim 13, wherein each of the first ray of light and the second ray of light covers an entire field of view.

15. A control unit for displaying image information with a projection device, comprising:
a control device configured to perform the following:
generating at least one first ray of light and a second ray of light, wherein the projection device projection device includes an image-generation unit to generate the at least one first ray of light representing first image information, and the second ray of light representing second image information, the first ray of light and the second ray of light differing from each other with regard to a beam divergence, and the first image information and the second image information differing from each other with regard to a perceivable image sharpness, and at least one deflection element to display the first image information within a first field of view of an eye using the first ray of light, and to display the second image information within a second field of view of the eye using the second ray of light, the second field of view being located outside the first field of view; and
deflecting the first ray of light to display the first image information within the first field of view, and deflecting the second ray of light to display the second image information within the second field of view;
wherein the image-generation unit generates the first ray of light and the second ray of light so that the first image information has a greater perceived image sharpness than the second image information, wherein the deflecting includes: (i) displaying the first image information within a central field of view of the eye as the first field of view, and/or (ii) displaying the second image information within a peripheral field of view of the eye as the second field of view; and
wherein the first image information and the second information represent exactly the same image content as one another but at the differing perceived image sharpness relative to one another.

16. The control unit as recited in claim 15, wherein each of the first ray of light and the second ray of light covers an entire field of view.

17. A non-transitory computer readable medium on which is stored a computer program, including program code for displaying image information with a projection device, the computer program, when executed by a processor, causing the processor to perform:
generating at least one first ray of light and a second ray of light, wherein the projection device projection device includes an image-generation unit to generate the at least one first ray of light representing first image information, and the second ray of light representing second image information, the first ray of light and the second ray of light differing from each other with regard to a beam divergence, and the first image information and the second image information differing from each other with regard to a perceivable image sharpness, and at least one deflection element to display the first image information within a first field of view of an eye using the first ray of light, and to display the second image information within a second field of view of the eye using the second ray of light, the second field of view being located outside the first field of view; and
deflecting the first ray of light to display the first image information within the first field of view, and deflecting the second ray of light to display the second image information within the second field of view;
wherein the image-generation unit generates the first ray of light and the second ray of light so that the first image information has a greater perceived image sharpness than the second image information, wherein the deflecting includes: (i) displaying the first image information within a central field of view of the eye as the first field of view, and/or (ii) displaying the second image information within a peripheral field of view of the eye as the second field of view; and
wherein the first image information and the second information represent exactly the same image content as one another but at the differing perceived image sharpness relative to one another.

18. The non-transitory computer readable medium as recited in claim 17, wherein each of the first ray of light and the second ray of light covers an entire field of view.

* * * * *